May 14, 1963 J. E. COLLINS 3,089,509
THREE-WAY VALVE AND SLEEVE SEAT
Original Filed Jan. 10, 1955
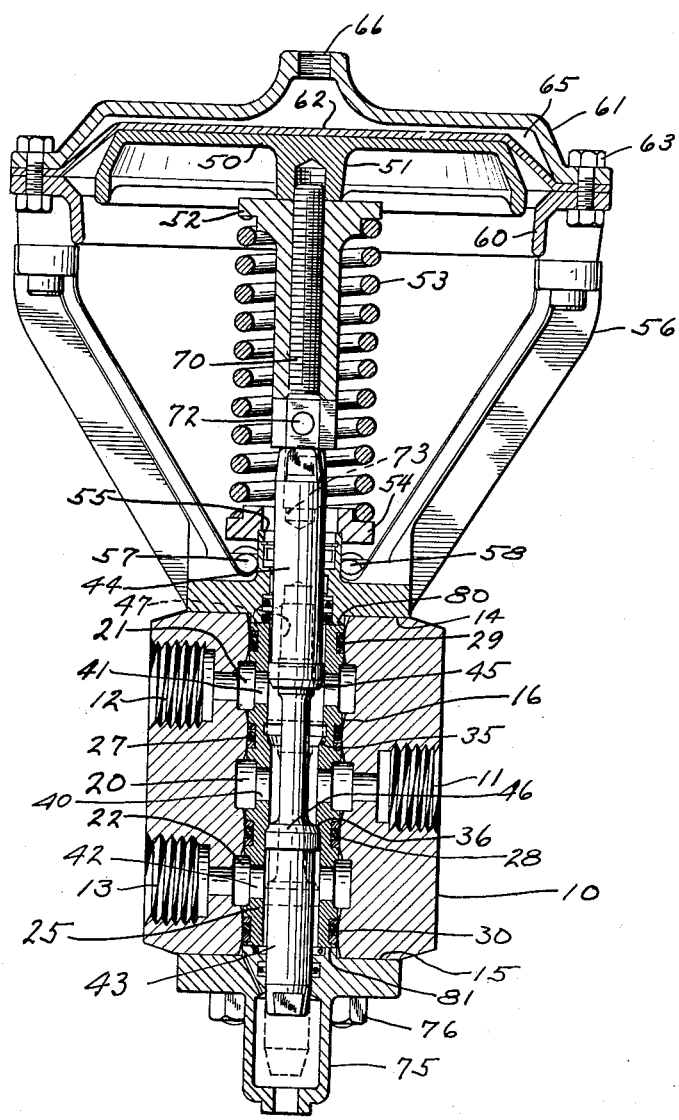
INVENTOR.
JOHN E. COLLINS
BY
Bates, Teare & McBean
ATTYS.

United States Patent Office 3,089,509
Patented May 14, 1963

3,089,509
THREE-WAY VALVE AND SLEEVE SEAT
John E. Collins, Akron, Ohio, assignor to International Basic Economy Corporation, New York, N.Y., a corporation of New York
Continuation of application Ser. No. 480,809, Jan. 10, 1955. This application Mar. 4, 1959, Ser. No. 797,263
2 Claims. (Cl. 137—454.6)

This invention relates to valves and particularly to those which are adapted for use in high pressure operation, as for example in connection with the actuation of a hydraulic press. This application is a continuation of my co-pending application, Serial No. 480,809 filed January 10, 1955, now abandoned.

According to this invention valve seats engageable by a stem member are formed integrally on the inside of a single sleeve member extending through a surrounding valve body. Among the advantages derived from this construction is that the seats are maintained in accurate alignment even though the body portion may tend to distort or warp somewhat under temperature and pressure changes. Also, the seats may be initially machined and lapped in a single cutting operation so that the seats are in perfect alignment, which alignment will be preserved when the sleeve is eventually installed in the valve body. For maintenance purposes, the entire single piece sleeve may be easily slipped out of the valve body to permit refinishing of the valve seats. Additionally a valve featuring this single sleeve construction may be designed effectively to minimize crossover loss and hydraulic shock when the valve stem is shifted from one position to another.

In the drawings, the FIGURE shows a vertical section through a valve embodying the present invention.

The valve illustrated is one which is adapted for use in controlling the flow of fluid under pressure from a source of supply to either one of two outlet conduits under the control of a fluid pressure actuator, the latter of which is remotely controlled by an operator. Thus, the valve illustrated has a body 10, which is provided with an inlet passageway 11, and two outlet passageways 12 and 13 respectively. The body may be of any desired cross-sectional shape, but preferably has parallel top and bottom faces 14 and 15 respectively, which are disposed normal to the axis of a bore 16. The bore extends entirely through the body and has a re-entrant annular grooves 20, 21, and 22, in communication with the passageways 11, 12, and 13 respectively.

A one-piece sleeve 25 is disposed within the bore and extends for substantially the full length thereof. It is in sealing engagement with the bore as for example by O-rings 27 and 28 between the central groove 20 and the outer grooves 21 and 22 respectively, and by O-rings 29 and 30 which are positioned between the outer grooves 21 and 22 and the associated outer faces 14 and 15 respectively.

The sleeve 25 has a pair of oppositely facing beveled shoulders forming seats 35 and 36, which are positioned on opposite sides of the central groove 20, and additionally has radially extending circular openings 40, 41, and 42 which are adapted to provide communication between the interior of the sleeve and the grooves 20, 21 and 22 respectively.

A valve stem is slidably positioned within the sleeve and is shown as having a lower portion 43 and an upper portion 44, which are threadedly connected together at 47. The stem has heads 45 and 46 which are adapted selectively to engage respective sleeve seats 35 and 36 in accordance with the selective position of the stem within the sleeve. In the full line position, illustrated, the seat 36 and head 46 are in engagement, at which time fluid may flow from the inlet 11 through the sleeve and be discharged at the outlet 12. The dotted line position shows the stem in the lowermost position, at which time the seat 35 and head 45 are in engagement, whereupon fluid will flow from the inlet 11 through the sleeve and be discharged at the outlet 13.

Movement of the valve stem, in the embodiment shown, is controlled by a piston 50 which has a hub 51 bearing against a spring retainer nut 52, the latter of which provides an abutment for a spring 53. The opposite end of the spring engages a washer 54 which, in turn, is supported upon a collar 55 projecting from a yoke 56. The yoke is seated upon the face 14 of the body, and is fastened thereto, by studs and nuts indicated at 57 and 58 respectively.

The yoke supports a top ring 60 and a top cover 61. A diaphragm 62 is clamped between the top ring and cover by securing members 63 and bears against the top face of the piston, thereby providing a chamber 65 for receiving fluid under pressure through the inlet 66. The inlet is threaded to receive a conduit for connection to a source of fluid pressure under remote control by an operator, in the customary way.

The valve stem is shown as being adjustably connected to the piston 50 by means of a stem extension screw 70, which engages a threaded bore within the spring retainer nut 52. The extension 70 may have an opening 72 at the head end thereof for permitting the insertion of a tool, to rotate the extension screw, and thereby to adjust the tension on the spring 53. It is understood that the stem extension is connected to the upper portion of the stem, as by the threaded connection, indicated by the dotted line 73.

The bottom of the valve body may be closed by a cap 75 which bears against the face 15 and is attached thereto by securing members 76. The sleeve is preferably locked in position within the body by means of a flange 80, on the lower face of the yoke, and a flange 81 on the upper face of the cap, which engage the upper and lower ends respectively of the sleeve.

From the foregoing description it will be noted that the piston and spring assembly constitute one unit which is carried by the yoke, so that upon removal of the yoke from the body, the sleeve and stem are carried with it. On the other hand, the sleeve and stem may be withdrawn from the bottom of the body upon removal of the cap 75, and upon disengagement of the stem from the extension screw 70, or by disengagement of the lower portion of the stem from the upper portion, as desired.

Where the nature of the installation indicates the desirability of removing the yoke from the body, such accomplishment can be effected merely by removing the conduit connection to the inlet 66, and removing the fastening members 57 and 58. This can be done without disturbing the pipe connections to the openings 11, 12, and 13, respectively. On the other hand, where the nature of the installation enables the cap 75 to be removed, it is possible to withdraw the sleeve and valve stem without breaking any of the aforesaid pipe connections.

The foregoing invention is shown in connection with a valve body having an inlet and two outlet ports, but it is to be understood that the principle of valve stem and sleeve assembly is equally applicable to valve bodies having other port arrangements, and that it is likewise applicable to valve stems which may be operated by means other than fluid pressure.

I claim:

1. A flow control valve comprising a valve body having opposing end faces and a main bore through the body open to both said end faces; an integral one-piece sleeve in said main bore, said sleeve having on its interior side a pair of smooth conical valve seats which are integral with the sleeve and are disposed axially and in spaced apart relation to each other with their smaller diameter regions directed toward each other, and said sleeve also having on its interior side a smooth circumferentially continuous guide bore leading from a region near the larger diameter region of each said conical seat toward the end of the sleeve; a first port through the sleeve wall opening to the interior of the sleeve between said valve seats, and a pair of second ports through the sleeve wall each opening into the interior of the sleeve in the region of one of said smooth guide bores and spaced away from the adjoining valve seat; axially spaced annular sealing means encircling said sleeve and engaged between the outside of the sleeve and the main bore of the body between said first port and each of said second ports; passageways through said valve body opening into the bore and communicating with said sleeve ports; a valve stem thru said sleeve having a pair of head portions disposed to engage corresponding valve seats, the head portions being separated axially a greater distance than said seats and said head portions being connected by a narrow shank extending through both said valve seats, and each head portion having a cylindrical shoulder slidable snugly in its adjacent guide bore of the sleeve and terminating in a smooth conical valve face complementary to its adjacent valve seat in the sleeve the spacing of each of said pair of sleeve ports from its seat being such that one of said head portions seals its adjacent sleeve port from said first port prior to the opening of the other of said pair of sleeve ports by the other head portion; a pair of end closures removably engaged with said end faces of the valve body and cooperating to fasten said sleeve in said main body bore; and said stem having one end extending through and beyond one of said end closures; means biasing said stem in one direction axially of said sleeve, and means responsive to fluid pressure, engaged with said extending end of the valve stem to displace said valve stem axially against the opposition of said biasing means whereby the face of each head portion of the stem is selectively engaged with its respective valve seat while the other head portion is disengaged from its valve seat.

2. In a flow control valve, a valve body having a main bore extending entirely through the body; an integral one-piece sleeve in said main bore said sleeve having on its interior side a pair of smooth conical valve seats which are integral with the sleeve and which are disposed in axial alignment with their smaller diameter regions directed toward each other, and said sleeve also having on its interior side a smooth guide bore leading from a region near the larger diameter region of each said conical seat toward the adjacent end of the sleeve; a first sleeve port through the sleeve wall opening into the interior of the sleeve between said valve seats; a pair of sleeve ports through the sleeve wall opening into the interior of the sleeve in the region of said smooth guide bores so that both valve seats are intermediate said ports; annular sealing means encircling said sleeve between said ports and engaged between the outside of the sleeve and said main bore of the body; passageways through said valve body opening into said main bore and communicating with said sleeve ports; a valve stem extending through said sleeve and having a pair of head portions disposed to engage corresponding valve seats, the head portions being separated axially a greater distance than said seats and said head portions being interconnected by a narrow shank extending through both valve seats, and each head portion terminating in a cylindrical shoulder slidable snugly in the guide bore adjacent its respective valve seat and having on its end a smooth conical valve face complementary to its adjacent valve seat in the sleeve the spacing of each of said pair of sleeve ports from its seat being such that one of said head portions seals its adjacent sleeve port from said first port prior to the opening of the other of said pair of sleeve ports by the other head portion; a pair of end closures removably engaged with the opposite ends of the valve body to enclose said main bore so that the sleeve and at least a portion of said stem is removable selectively through either end of the main bore by disconnecting one of said end closures; and said stem having one end extending slidably through one of said end closures, and means for reciprocating said stem in said sleeve to selectively engage the valve face of each head with its respective valve seat while disengaging the valve face of the other head from its valve seat.

References Cited in the file of this patent
UNITED STATES PATENTS

| | | |
|---|---|---|
| 1,813,222 | Barrett | July 7, 1931 |
| 2,039,099 | Mastenbrook | Apr. 28, 1936 |
| 2,469,921 | Hoge | May 10, 1949 |
| 2,471,285 | Rice | May 24, 1949 |
| 2,506,129 | Ashton | May 2, 1950 |
| 2,658,523 | Johnson | Nov. 10, 1953 |
| 2,661,762 | Bryant | Dec. 8, 1953 |
| 2,716,425 | Yarber | Aug. 30, 1955 |